…

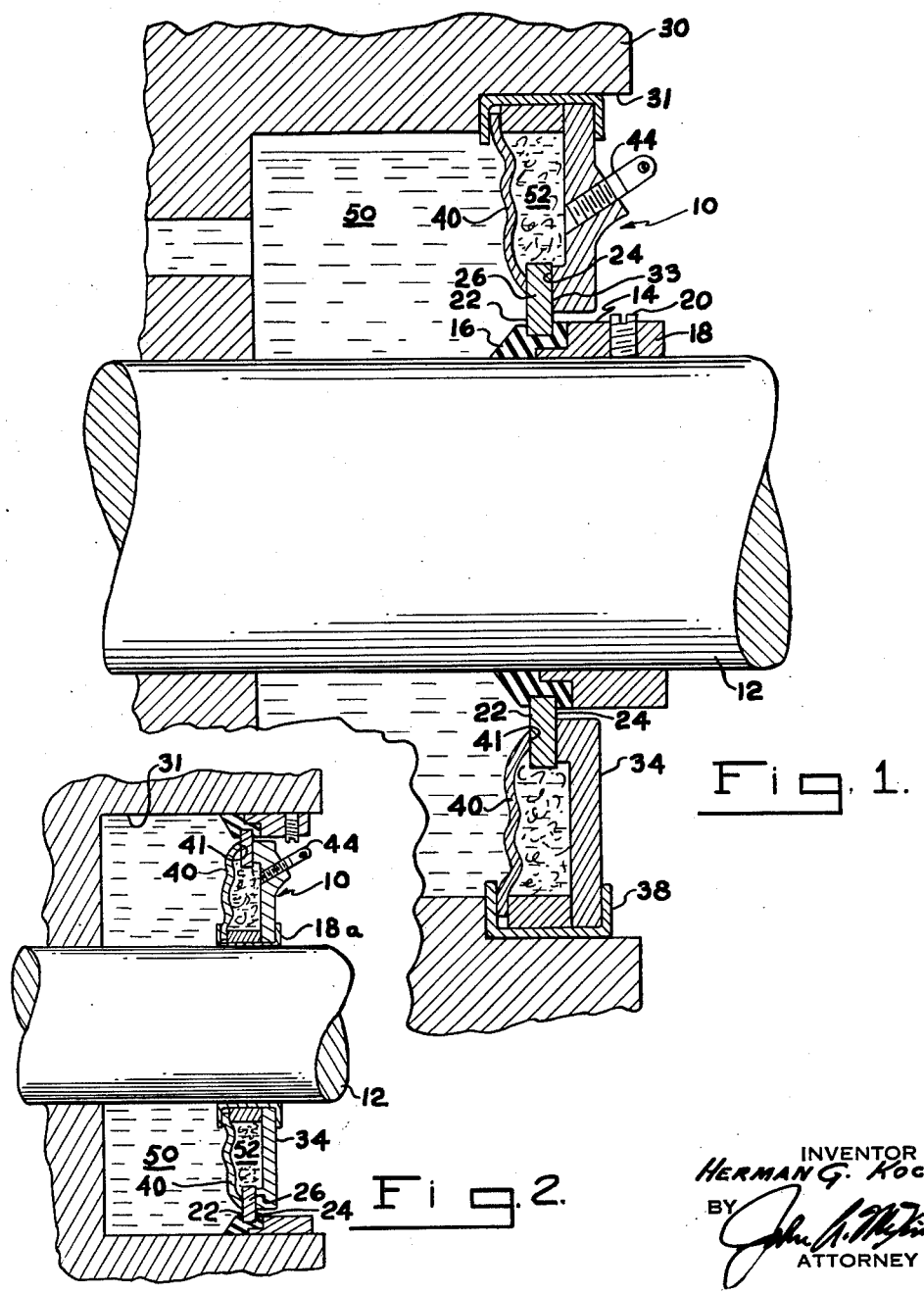

United States Patent Office 3,190,660
Patented June 22, 1965

3,190,660
MECHANICAL SEAL FOR FLUID TRANSFER MEANS
Herman G. Koch, Somerville, N.J., assignor to Johns-Manville Corporation, New York, N.Y., a corporation of New York
Filed Dec. 13, 1961, Ser. No. 159,070
2 Claims. (Cl. 277—59)

This invention relates to seals for preventing leakage of fluid between relatively moving parts. More particularly, this invention relates to a mechanical seal comprising a rotating member in abutment and for sealing engagement with a non-rotating member, which mechanical seal is employed as part of apparatus by means of which a fluid is transferred.

Sealing devices heretofore employed in conjunction with a pump or other fluid transferring means have utilized a contact seal wherein relatively rotatable parts of apparatus have been pressed into contact with each other. The fluid being conveyed by the machine is also usually employed as a coolant for the contact seal. While such seals are satisfactory for apparatus operating under certain conditions, they have not been satisfactory for use with apparatus which transfer fluids containing contaminants in the form of dirt particles, which dirt particles lodge between the relatively rotating parts, and/or with apparatus which transfer fluids having unfavorable lubricating characteristics, such as carbon tetrachloride.

Accordingly, it is an object of this invention to provide a new and improved moving seal for sealing against the passage of a fluid containing contaminants through the journal of relatively moving parts.

Another object of this invention is to provide a seal wherein the fluid to be sealed is isolated from the lubricant employed to lubricate the journal between relatively moving parts.

Further objects and advantages of this invention will appear from the following description of specific embodiments thereof.

A preferred embodiment of this invention is adapted to operate in conjunction with a rotary pump for transferring a fluid medium. In accordance with the invention, the fluid medium is sealed against passage through the journal of the rotating shaft by means of an annular member journaled for rotation with the shaft and having a pair of sealing faces, one of said faces being in abutment with cooperating closure means closing off the end face of the recess in which the seal is mounted, the other of said faces being in abutment with a flexible diaphragm, said diaphragm defining with said cooperating closure means an outer chamber for retaining a lubricant, said flexible diaphragm being sufficiently resilient to maintain a close running fit with the abutting sealing face and being responsive to the pressure of the fluid being sealed to maintain sealing abutment with said sealing face and to urge the lubricant toward the area of contact between said flexible diaphragm and the abutting sealing face.

In the accompanying drawing:
FIG. 1 is a cross-sectional view through the seal of a preferred embodiment of this invention shown in conjunction with the housing of a rotary pump.
FIG. 2 is a cross-sectional view of an alternate embodiment of the seal of this invention.

Referring to the drawing, the housing 30 journals and supports the shaft 12 of the impeller (not shown). It will be understood that the housing 30 may form part of any apparatus in which a fluid is employed such as pumps, turbines, etc., and wherein it is desired to exclude the passage of the fluid past a wall through which a rotating member such as shaft 12 extends. The seal generally designated by the numeral 10 is supported within recess 31 of housing 30. Annular member 26 is journaled for rotation with shaft 12 by means of journal 14. Journal 14 is shown to be comprised of a resilient collar 16 of elastomeric material or the like and a rigid collar 18, which may be of metal, secured to shaft 12 by means of set screw 20. The annular member 26 has a pair of radial and opposing sealing faces 22 and 24 for a purpose hereinafter to be described.

End cap 34 together with retaining ring 38 provide cooperating means with journal 14 for closing off recess 31. Annular face 33 of end cap 34 cooperatively engages face 24 of annular member 26 to form a primary seal between the interior and exterior of housing recess 31. A diaphragm 40 depends from retaining ring 38 to divide recess 31 into an inner chamber 50 and an outer chamber 52. Outer chamber 52 is provided with a suitable lubricant introduced through fitting 44 principally for transfer to the primary seal defined by faces 24 and 33. An edge portion 41 of diaphragm 40 resiliently engages face 22 of annular member 26 to form a secondary seal which deters entry of the fluid to be sealed into outer chamber 52 and contamination of the lubricant therein. The diaphragm 40 is sufficiently resilient to respond to pressure changes in inner chamber 50, which pressure changes may be due to changes in speed of shaft 12, and thereby equalize the pressures in chambers 50 and 52. The fluid pressure upon diaphragm 40 also serves to express the lubricant to the sealing faces of annular member 26. With such an arrangement passage of the fluid to the primary seal is substantially eliminated, thereby insulating its sealing faces to exposure to the fluid being pumped or to be sealed.

In summary the instant invention provides a mechanical seal structure for mounting in a stuffing box or the like, and which generally includes a stationary sealing element affixed to the housing, a rotating sealing element affixed to a rotating shaft, and a resilient diaphragm secured at its outer edge to the housing and having its inner edge abutting the rotating sealing element so as to urge it into contact with the stationary sealing element. The diaphragm and sealing elements form a closed chamber around the shaft, which chamber is adapted to be supplied with a lubricant such as grease, a suspension of graphite or the like. The diaphragm is exposed inwardly of the stuffing box to the fluid to be sealed in a manner such that the pressure of the fluid acting against the diaphragm serves to express the lubricant between the contacting surfaces of the stationary and rotating sealing elements. A particular feature of this arrangement is that the forces corresponding to the fluid pressures within the stuffing box provides a self-lubricating and self-compensating device without creating a pressure differential between the lubricant and the fluid to be sealed, thereby deterring contamination of the lubricant and thereby insulating the primary sealing faces from exposure to the fluid to be sealed.

Although the seal has been heretofore described as to the preferred embodiment, it will be understood that the arrangement of the stationary sealing elements and the rotating sealing element may be reversed, in the manner illustrated in FIG. 2, in those devices where high pressures are not encountered; i.e. to say, that the diaphragm 40 and the end cap 34 may be affixed to shaft 12 by suitable means 18a for rotation therewith and annular member 26, with its sealing faces 22 and 24, may be fixed to housing 31. It is not contemplated to employ such alternative arrangement where the shaft 12 is rotated at high speed since the centrifugal force generated may tend to exude the lubricant within outer chamber 52 to an undesirable degree through the secondary seal formed by sealing face 22 and diaphragm edge portion 41.

Although the seal has been described in detail as to its component parts, it will be understood that such detail is for the purpose of illustration and not by any of limitation. The appended claims are therefore intended to cover all modifications coming within the true scope of the invention.

What I claim:

1. A fluid tight mechanical sealing structure comprising, in combination:
   (a) a rotary shaft journaled to rotate in a housing,
   (b) said housing defining a fluid chamber containing a fluid to be sealed;
   (c) an annular seal member journaled for rotation with said shaft and having a first sealing face;
   (d) cooperating closure means comprising an end cap closing off a recess portion of the housing through which said shaft extends;
   (e) said closure means defining a stationary and annular sealing face at an edge portion thereof and in mutual engagement with said first sealing face to form a primary seal; and
   (f) a flexible and resilient diaphragm member transverse to said shaft extending from said seal member having an edge portion maintaining a close running fit and forming therewith a secondary seal, and defining with said closure means a lubricant chamber, said diaphragm being directly exposed to said fluid and sufficiently responsive to increased pressure to urge lubricant from said lubricant chamber toward said primary seal.

2. The structure as described in claim 1 wherein said fluid and said lubricant chambers are isolated from each other and axially spaced along said shaft.

References Cited by the Examiner

UNITED STATES PATENTS

| 1,850,571 | 3/32 | Shively | 277—88 XR |
| 2,750,011 | 6/56 | Pringle | 277—42 XR |

EDWARD V. BENHAM, *Primary Examiner.*

WILLIAM FELDMAN, *Examiner.*